Nov. 3, 1925.
G. W. LINGLE ET AL
SURVEYOR'S INSTRUMENT
Filed July 3, 1924
1,559,716
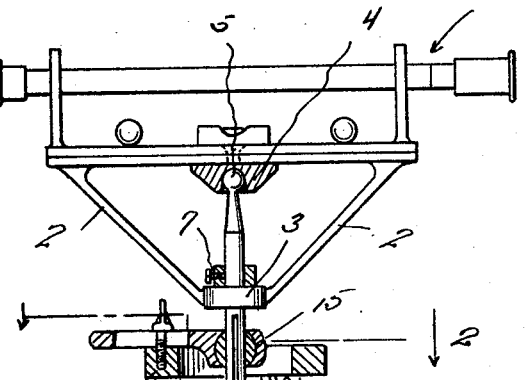
Fig. 1.
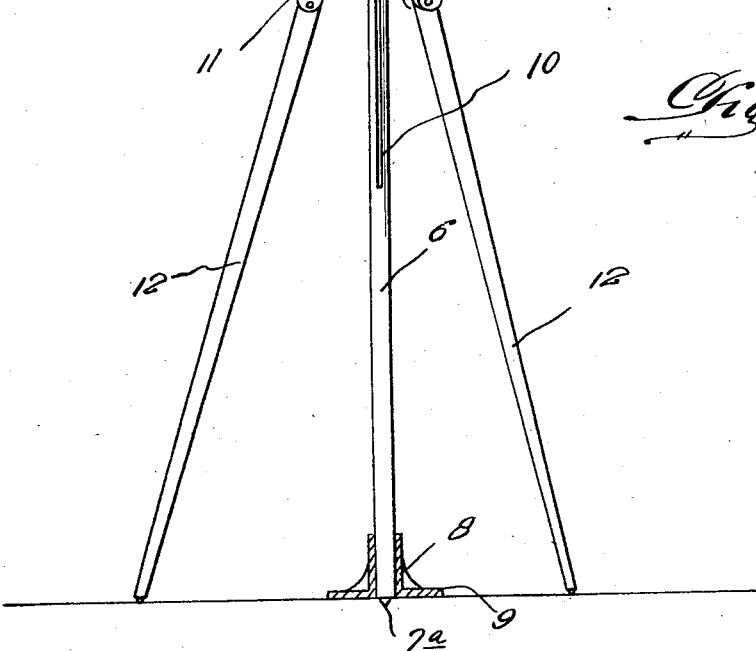
Fig. 2.
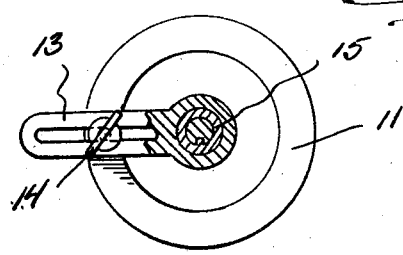
G. W. Lingle,
J. Werkhoff,
Inventors
By Clarence A. O'Brien
Attorney Patented Nov. 3, 1925.

1,559,716

UNITED STATES PATENT OFFICE.

GEORGE W. LINGLE AND JOSEPH KERKHOFF, OF KENOSHA, WISCONSIN.

SURVEYOR'S INSTRUMENT.

Application filed July 3, 1924. Serial No. 724,057.

*To all whom it may concern:*

Be it known that we, GEORGE W. LINGLE and JOSEPH KERKHOFF, citizens of the United States, residing at Kenosha, in the county of Kenosha and State of Wisconsin, have invented certain new and useful Improvements in Surveyors' Instruments, of which the following is a specification.

This invention relates broadly to that class of invention known as measuring instruments, but it has more particular reference to a species of this class which is particularly adapted for use by surveyors.

Instruments of this class now used by surveyors are of such construction that it is exceedingly difficult for a non-skilled person to accurately use the same.

This difficulty may be traced to the fact that with an ordinary instrument, an expert surveyor is required to obtain the horizontal measuring line essential for carrying out the work. With the conventional surveyors' instruments now marketed and manufactured, it is essential to adjust the legs of the usual supporting tripod relatively to each other, to obtain the horizontal indicating line sometimes referred to as "H—I". Of course, on extremely irregular and uneven contours, considerable skill is required in obtaining this line of sight, and this is naturally a predominating disadvantage of the present day instrument.

To overcome the foregoing circumstances, we have evolved and produced a novel structure and arrangement of parts, which will enable any person having a slight knowledge of the use of the surveyor's instrument to readily determine the essential horizontal indicating line.

Broadly described and briefly speaking, the present invention embodies a conventional surveyor's instrument table for supporting the usual spirit levels, etc., and a tripod. In the present case, however, it is not essential that the tripod be adjustable, but the legs may be pivoted to render the structure compact and to assist in resting this part upon the ground. Instead of connecting the instrument with the tripod in the usual way, I connect it thereto, through the medium of a universal joint which is adjustable radially with respect to the head of the tripod, and also provide a sliding joint, which permits vertical adjustment for elevation. Thus, the instrument itself may be placed on a horizontal or level line, and the tripod adjusted about universal and sliding joints, so that it may be seated on the ground, whether the ground is level or inclined.

Numerous other features and advantages of the invention will be rendered apparent from a reading of the following description, in connection with the drawings.

In the accompanying drawing, forming a part of this specification, and in which like numerals are employed to designate like parts throughout the same:

Figure 1 is a view, partly in elevation, and partly in section, showing a surveyor's instrument constructed in accordance with the present invention.

Figure 2 is a section, taken substantially on the line 2—2 of Figure 1 looking in the direction of the arrows.

In carrying out the present invention, we supply a conventional form of surveyor's measuring instrument, which is here generally referred to by the reference character 1. This instrument, as usual, embodies the customary spirit level and sight device. In the present instance, however, it is provided on its under side with a pair of downwardly diverging arms 2, which are connected at their adjacent ends to a ring 3. On the bottom of the table of the instrument is a socket 4 for reception of a ball 5, on the upper end of a vertically disposed rod 6. This ball and socket joint provides a pivotal connection of the instrument with the rod, to permit the instrument to be turned freely about the rod. To connect the instrument with the rod, an adjustable collar 7 is placed upon the rod between the ball and the ring, the collar being held in fixed position by a set screw or its equivalent. It is with this structure that the instrument is at all times retained in a truly right angular position with respect to the rod. This fixed angular relation of the measuring instrument with respect to the rod is an important factor of the present invention. It is to be observed that the lower end of the rod 6 is pointed, as at 7, to assist in maintaining it in engagement with the usual stake in the ground. Surrounding the rod above the pointed end is a collar 8, equipped with a flat base 9, adapted to seat upon the stake. It is yet to be pointed out that the rod is provided, intermediate its ends with an elongated longitudinal groove 10, functioning as a keyway. The aforesaid tripod comprises an annular head 11, to the under side of which the supporting legs 12 are pivoted. As before intimated, the rod 6 is connected with the tripod, in a manner to permit the two to be relatively adjusted for acquiring the desired line of level. Although other means could probably be used for obtaining this end, we prefer to use a clamp comprising a longitudinally slotted arm 13, which is adapted to rest on top of the head 11, being connected thereto through the medium of a thumb screw 14. The inner end of the arm is annular and is fashioned to form a seat for a ball-like joint 15. As seen in Figure 2, the ball joint 15 is provided with an internal rib, forming a key, which is slidable in the aforesaid key way 10. With this arrangement, it will be observed that a universal joint between the arm 13 and rod 6 is provided. Also, the rod 6 can be slid vertically through the universal joint, and the rod 6 and the instrument carried by the upper end thereof can be bodily adjusted by sliding the arm 13.

In practice, a stake is driven in the ground in a truly vertical position. Then, the pointed end 7 of the supporting rod 6 is forced slightly into the top of the stake. Assuming that the stake has been properly driven, the base 9 of the sleeve 8 will seat flatly upon the top of the stake, thus positioning the rod 6 in an approximate perpendicular position. As the instrument on the top of the rod 6 is, as before stated, in fixed angular relation to this rod, as soon as the latter reaches the perpendicular line, which may be readily determined by viewing the levels, the instrument is promptly set upon the horizontal indicating line. Now, through the medium of the sliding bracket arm 13, the universal ball joint 15 and sliding key and key-way, the legs of the tripod can be readily and easily seated on the surface of the ground, regardless of the irregularity of the contour thereof. Thus, by simply rendering the supporting rod 6 plumb, the measuring instrument is properly positioned so that a horizontal line, at right angles to the perpendicular line is accurately obtained.

Undoubtedly, it will be readily evident from the foregoing description and drawing, that a structure, such as shown and described, will obviate the necessity of adjusting the legs of the tripods by moving them toward and from each other and extending them for inclination, etc. Whereas skillful persons were heretofore required for surveying land, it is possible with the use of the present device, for comparatively unskilled hands to survey owing to the fact that it is very easy to acquire the horizontal line "H—I".

We claim:

1. A device of the kind described comprising a tripod having a ring-like head at its upper end, a ground engaging rod passing downwardly through and beyond said head, an instrument holder swivelly mounted upon the upper end of said rod, means for disposing and maintaining said holder in right angular relation to the rod, and a universal and sliding connection between the rod and head of said tripod, whereby to permit the tripod to be bodily adjusted vertically upon or eccentrically to said rod.

2. In a supporting structure for a surveyor's instrument, a rod adapted for vertical disposition and intended to rest upon a relatively stationary horizontal surface, an instrument table rotatably supported upon the upper end of said rod and disposed in a permanent angular relation to said rod, a tripod including supporting legs and a ring-like head at its top, a connecting arm between the head and rod, said arm having slidable connection with the head, and having universal joint connection at its inner end with said rod, said rod being slidable with respect to said joint connection.

In testimony whereof we affix our signatures.

GEORGE W. LINGLE.
JOSEPH KERKHOFF.